United States Patent
Kamil et al.

(10) Patent No.: US 11,227,359 B2
(45) Date of Patent: Jan. 18, 2022

(54) USER-DEFINED IMAGE COMPOSITING ON GRAPHICS PROCESSING UNITS

(71) Applicant: ADOBE INC., San Jose, CA (US)

(72) Inventors: Shoaib Ashraf Kamil, Brooklyn, NY (US); John William Beier, Brooklyn, NY (US)

(73) Assignee: ADOBE INC., San Jose, CA (US)

( * ) Notice: Subject to any disclaimer, the term of this patent is extended or adjusted under 35 U.S.C. 154(b) by 224 days.

(21) Appl. No.: 16/653,417

(22) Filed: Oct. 15, 2019

(65) Prior Publication Data

US 2021/0110507 A1    Apr. 15, 2021

(51) Int. Cl.
*G09G 5/377* (2006.01)
*G06T 1/60* (2006.01)
*G06T 1/20* (2006.01)
*G06T 1/00* (2006.01)
*G09G 5/36* (2006.01)

(52) U.S. Cl.
CPC .............. *G06T 1/20* (2013.01); *G06T 1/0007* (2013.01); *G06T 1/60* (2013.01); *G09G 5/363* (2013.01); *G09G 5/377* (2013.01); *G06T 2200/28* (2013.01)

(58) Field of Classification Search
None
See application file for complete search history.

(56) References Cited

U.S. PATENT DOCUMENTS

| | | | | |
|---|---|---|---|---|
| 6,803,923 | B1* | 10/2004 | Hamburg | G06T 15/503 345/629 |
| 2007/0220168 | A1* | 9/2007 | Parsons | G06F 9/542 709/246 |
| 2009/0225093 | A1* | 9/2009 | Harper | G06T 1/60 345/522 |
| 2017/0316541 | A1* | 11/2017 | Kim | G06T 1/20 |
| 2020/0211148 | A1* | 7/2020 | Mackinnon | G06T 11/40 |
| 2021/0096917 | A1* | 4/2021 | Cerny | G06F 9/5083 |

OTHER PUBLICATIONS

Ragan-Kelley, Jonathan; Halide: A Language and Compiler for Optimizing Parallelism, Locality, and Recomputation in Image Processing Pipelines; Jun. 16, 2013; ACM SIGPLAN Notices; vol. 48; Issue 6; p. 519 (Year: 2013).*

* cited by examiner

*Primary Examiner* — Joni Hsu
(74) *Attorney, Agent, or Firm* — Shook, Hardy & Bacon, LLP

(57) ABSTRACT

Methods, systems, and computer-storage media fare provided for utilizing a GPU for user-defined image compositing operations. A sequence of compositing operations is determined for a graphical image document based on at least one user-defined layer property such as a layer mode or an opacity level. A domain-specific language runtime, such as Halide runtime, is used to provide encoded objects for each operation within the sequence with the code being optimized for the GPU platform. A command buffer with a plurality of commands comprising the encoded operations is created and committed to the GPU for execution of the compositing operations. Commands are committed to the GPU in an asynchronous nature such that additional command buffers may be created and committed the GPU prior to receiving a response from the GPU on an earlier command buffer.

14 Claims, 9 Drawing Sheets

USER-DEFINED IMAGE COMPOSITING ON GRAPHICS PROCESSING UNITS

BACKGROUND

Because a graphics processing unit (GPU) can generally perform image processing functions faster than a central processing unit (CPU), it is often desirable for image processing applications to utilize the GPU for at least some functions. However, because different GPU platforms call for different coding languages (including different optimizations) and application programming interfaces, the image processing application would either have limited utility or would require manually-written code for each GPU platform with which the application could be used. Current solutions include using a domain-specific language compiler, such as Halide, to generate and optimize code for different platforms. However, traditional use of these domain-specific languages involve either sending each operation individually to the GPU or sending predetermined sequences of operations. These traditional uses do not work with image compositing processes because the sequence of functions are not predetermined and individually require too little computational power relative to the space and time needed to send data to and from the GPU such that use of the GPU is inefficient. As such, there exists a need for efficiently performing user-defined compositing operations on a GPU.

SUMMARY

Embodiments of the present invention include computer-implemented methods, systems, and computer-storage media for utilizing a GPU for user-defined image compositing operations. In accordance with embodiments, a sequence of operations for compositing multiple layers within a graphical image document is determined based on at least one user-defined layer property such as, for example, a layer mode, an opacity level, or the presence of a mask. In this way, at least some of the compositing operations are not predetermined.

A domain-specific language, such as Halide, is used to provide platform-optimized code for each operation within the sequence based on an indication of the platform of the GPU. A domain-specific language runtime (which may also be referred to as Halide runtime) provides operations encoded with the platform-optimized code for platform-specific objects, such as command buffers and encoders. A command buffer with a plurality of commands comprising the encoded operations is created and committed to the GPU for execution of the compositing operations. In this way, multiple compositing operations, including user-defined operations, may be committed to the GPU together rather than committing commands for each operation individually.

In exemplary embodiments, commands are committed to the GPU in an asynchronous nature such that additional command buffers may be created and committed to the GPU prior to the GPU completing work on an earlier command buffer. Rather than waiting for completion of the work, which may be signaled with a response from the GPU, embodiments of the present disclosure include determining when to commit the command buffer to the GPU for execution of the compositing operations based on a size of the command buffer, a number of commands within the command buffer, time elapsed since the previous command buffer was committed, or a combination thereof. Additionally or alternatively, determining when to commit the command buffer to the GPU may be based on a determination that all the compositing operations for a predetermined area of the graphical image document have been encoded.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
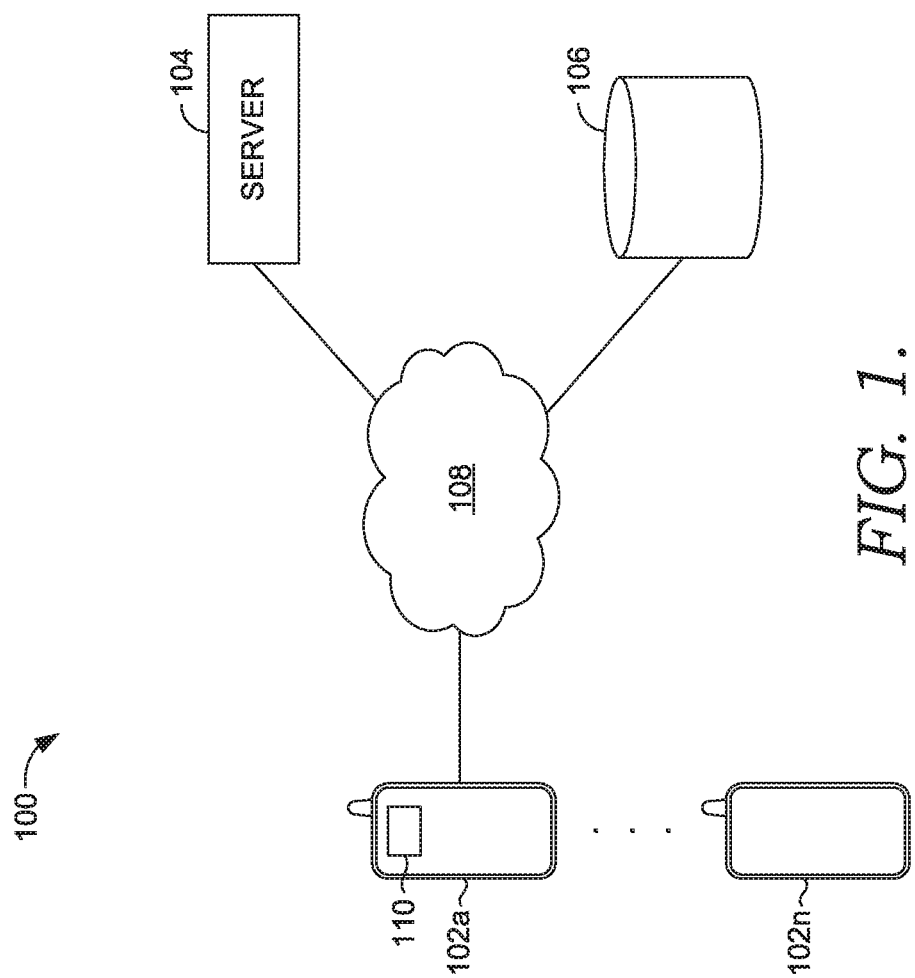
FIG. 1 depicts an example configuration of an environment in which one or more implementations of the present disclosure can be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed towards compositing layers within a graphical image document utilizing a domain-specific language, such as Halide, for operations performed on a graphics processing unit. A graphical image document is often comprised of layers of pixel data, which may be considered a stack of layers, and displaying the graphical image document requires combining the pixel data, which is referred to herein as compositing. The particular manner in which the pixel data is combined may be determined by user-specified parameters, such as a layer mode (also referred to as a blend mode or a color blending technique), an opacity level, and/or the presence (or absence) of a mask. For example, a graphical image document may comprise two layers in which the top layer has a "Normal" layer mode and a 100% opacity level. Compositing these layers results in the top layer completely obscuring the bottom layer such that the bottom layer is not visible in the final image presented to the user.

To provide a user with instant visual feedback, it is desirable to perform the compositing operations in real time or near real time. Image processing functions are generally performed much quicker on a graphics processing unit (GPU) than a central processing unit (CPU). However, because different GPU platforms may use different coding languages and different application programming interfaces, an image processing application with conventionally-created GPU code would either be limited to a particular platform or would require manually-written code for each GPU platform with which the application could be used.

Current solutions to this problem include using a domain-specific language compiler, such as Halide, to quickly generate and optimize code for different platforms without manually writing the code. Conventional domain-specific language compilers like Halide have their own runtime components that have control over committing work to the GPU for processing. Domain-specific language runtimes traditionally commit operations individually to the GPU and wait for the operations to complete before committing more operations. When the work is committed for each operation individually, the work is effectively synchronous. As a result, there may be a large amount of overhead for transferring the data to and from the GPU in addition to the lag due to waiting for work to finish. Because compositing operations individually require too little computational power relative to the space and time needed to send data to and from the GPU, using the GPU according to this process becomes inefficient. One solution to this inefficiency is to predefine a series of operations that can be encoded as a series ahead of time using a domain-specific language compiler. This solution may be used when the operations are known in advance so that they can be predefined such as with the application of image filters or standard image processing functions automatically applied to each image. However, sequences of image compositing operations that are not predetermined but, rather, are determined by the user cannot be encoded as pre-built series of operations. As such, the traditional use of a domain-specific language compiler and runtime to execute operations on the GPU is computationally inefficient for user-defined compositing.

Accordingly, embodiments of the present invention are directed to improving prior systems to enable efficient use of the GPU for user-defined compositing operations using a domain-specific language. Command buffers containing encoded compositing operations are used to instruct the GPU to perform the compositing operations, and rather than providing complete control over the command buffers to a domain-specific language component (such as a domain-specific language runtime), an application programming interface may be utilized to share control over the command buffers between the image processing application and the domain-specific language component. In exemplary embodiments, the image processing application utilizes the application programming interface to send an indication of the platform of the GPU to the domain-specific language component such that code generated and optimized for that particular platform is provided for the compositing operations. The image processing application, including a compositing engine, may determine to commit a command buffer once the command buffer satisfies a threshold size, number of operations, and/or time elapsed since committal of last command buffer. Additionally or alternatively, determining when to commit the command buffer to the GPU may be based on a determination that all the compositing operations for a predetermined area of the graphical image document have been encoded. As such, command buffers having multiple encoded operations may be sent together even when the operations are not predefined such as when the operations are based on at least some user-defined layer properties. Committing command buffers with multiple compositing operations that are performed asynchronously removes unnecessary computational overhead and wait time arising when operations are individually committed in a synchronous manner.

Further, in exemplary embodiments, determination of whether to commit a command buffer to the GPU is made regardless of whether a previously committed command buffer has finished processing on the GPU. In this way, command buffers may be committed asynchronously such that a new command buffer may be created and, in some instances, committed before the GPU has finished executing the operations on a previous command buffer, thereby reducing the overall time for compositing a graphical image document.

FIG. 1 depicts an example configuration of an environment in which some implementations of the present disclosure can be employed. It should be understood that the illustrated environment and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that the environment 100 shown in FIG. 1 is an example of one suitable operating environment. Among other components not shown, the environment 100 includes one or more user devices, such as user devices 102a through 102n, one or more servers 104, and one or more databases 106. Each of the components shown in FIG. 1 may be implemented via any type of computing device, such as one or more of computing device 800 described in connection to FIG. 8, for example. These components may communicate with each other via the network 108, which may be wired, wireless, or both. The network 108 may include multiple networks, or a network of networks, but is shown in simple form so as not to obscure aspects of the present disclosure. By way of example, the network 108 can include one or more wide area networks (WANs), one or more local area networks (LANs), one or more public networks such as the Internet, and/or one or more private networks. Where the network 108 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, the network 108 is not described in significant detail.

It should be understood that any number of user devices, servers, and other components may be employed within environment 100 within the scope of the present disclosure. Each may comprise a single device or multiple devices cooperating in a distributed environment.

The user devices 102a through 102n may be any type of computing device capable of being operated by a user. For example, in some implementations, the user devices 102a through 102n are the type of computing device described in relation to FIG. 8. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices 102a through 102n may include one or more processors and one or more computer-readable media. The computer-readable media may include computer-readable instructions executable by the one or more processors. The instructions may be embodied by one or more applications, such as application 110 shown in FIG. 1. The application 110 is referred to as a single application for simplicity, but its functionality can be embodied by one or more applications in practice. The user devices other than 102a can also include one or more applications similar to the application 110.

The application 110 may generally be any application capable of facilitating user-determined image processing functions either directly on the user device 102a or on a service provider server 104 via the network 108. As such, in some implementations, the application 110 may comprise a dedicated application, such as an application having image processing functionality, such as the image processing application 210 of FIG. 2. In addition, or instead, the application 110 may comprise a web browser application used for accessing a web application that can run in the web browser and could be hosted at least partially on the server-side of environment 100. In some cases, the application 110 is integrated into the operating system 100 (e.g., as a service). It is therefore contemplated herein that "application" be interpreted broadly.

In some embodiments, environment 100 includes one or more service provider servers 104 configured to communicate with the user devices 102a through 102n over the network 108. Generally, service provider servers 104 are configured to make various resources available over the network 108 to clients. In some scenarios, users may sign up for accounts that are employed to access corresponding resources from a provider. Such resources may include any suitable combination of content and/or services, such as image processing services. Accordingly, in one embodiment, a service provider server 104 includes functionality discussed with respect to the image processing application 210 of FIG. 2 that may be accessed by the user devices 102a through 102n via the application 110.

Environment 100 further includes database 106. Database 106 may store computer instructions (e.g., software program instructions, routines, or services), data, and/or models used in embodiments described herein. In some implementations, database 106 stores information or data received via the various components described in FIG. 2 for efficiently compositing using a GPU and provides the various components with access to that information or data as needed. For instance, database 106 may store optimized code generated from a compiler, such as domain-specific language compiler 216 of FIG. 2. Additionally or alternatively, database 106 may store images composited in accordance with embodiments of this disclosure. Although depicted as a single component, database 106 may be embodied as one or more data stores. Further, the information in database 106 may be distributed in any suitable manner across one or more data stores for storage (which may be hosted externally or internally). In some embodiments, database stores captured sensor data (such as image data).

Figure 2:
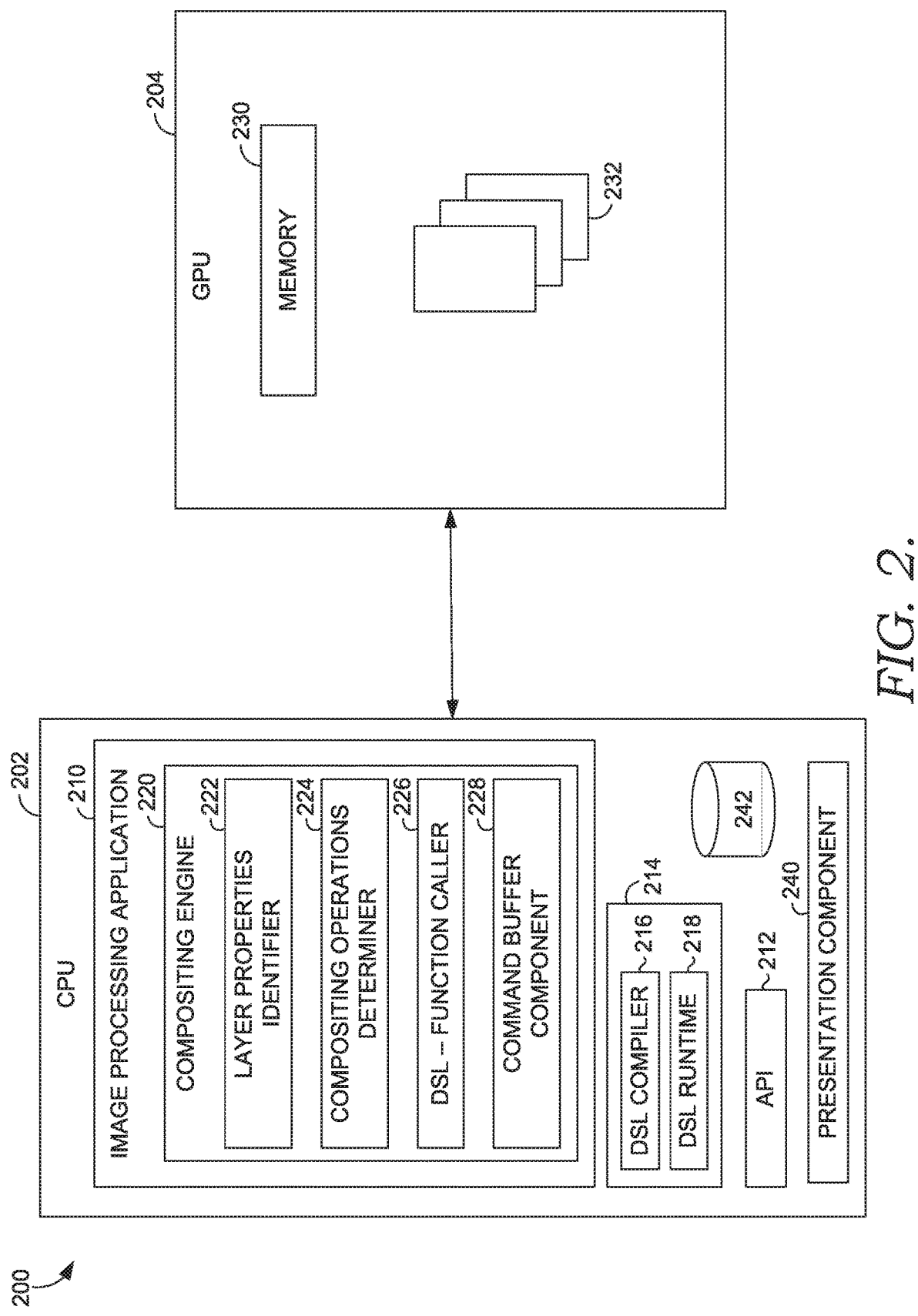
FIG. 2 depicts aspects of an example computing system for employing one or more implementations of the present disclosure.

Turning to FIG. 2, an example operating system 200 of hardware and software components in which various embodiments of the present disclosure may be implemented to efficiently perform digital image compositing with a graphics processing unit. At a high level, graphical image document layers are traversed to identify layer properties, such as layer mode and opacity level for instance, that determine how the layers are combined with each other and identifying a sequence of operations for combining the layers in accordance with the identified layer properties. Functions generated by a domain-specific language compiler, such as Halide, for performing the operations are called to put encoded operations into a command buffer in accordance with the sequence of operations. The operations are encoded in a platform optimized code based on the platform of the GPU. The command buffer with multiple operations is executed so that the program code and image data is sent to the GPU for rendering. In exemplary embodiments, compositing a single graphical image document includes creating and committing to the GPU multiple command buffers asynchronously as described further below.

System 200 includes a central processing unit (CPU) 202, which may be coupled via a bus (such as bus 810 in FIG. 8), to a graphics processing unit (GPU) 204. Example embodiments of the CPU 202 and the GPU 204 are described with respect to FIG. 8. While the CPU 202 and GPU 204 may be embodied in separated and distinct integrated circuits, they may, in one embodiment, be formed on a single chip or otherwise be implemented as a unitary integrated circuit. Accordingly, for the purposes of the present application, the terms "CPU" and "GPU" should be taken to refer to herein distinct processing domains that may or may not be distinct circuits.

The CPU 202 may be used to execute one or more operations of an image processing application 210. Although depicted within the CPU 202 in FIG. 2, it should be understood that one or more operations of image processing application 210 is carried out by the GPU 204 in accordance with embodiments of the present disclosure. The GPU 204 includes one or more shaders 232 to implement a graphics pipeline. Shaders 232 are processing subunits of the GPU 204 for calculating rendering effects on graphics hardware. In exemplary embodiments, one or more shaders 232 are responsible for performing compositing operations in an image processing application 210. The GPU 204 may also include memory 230. Memory 230 may include a GPU buffer that holds processed image data until it is presented to a user or sent back to the CPU 202 for further operation.

Figure 3:
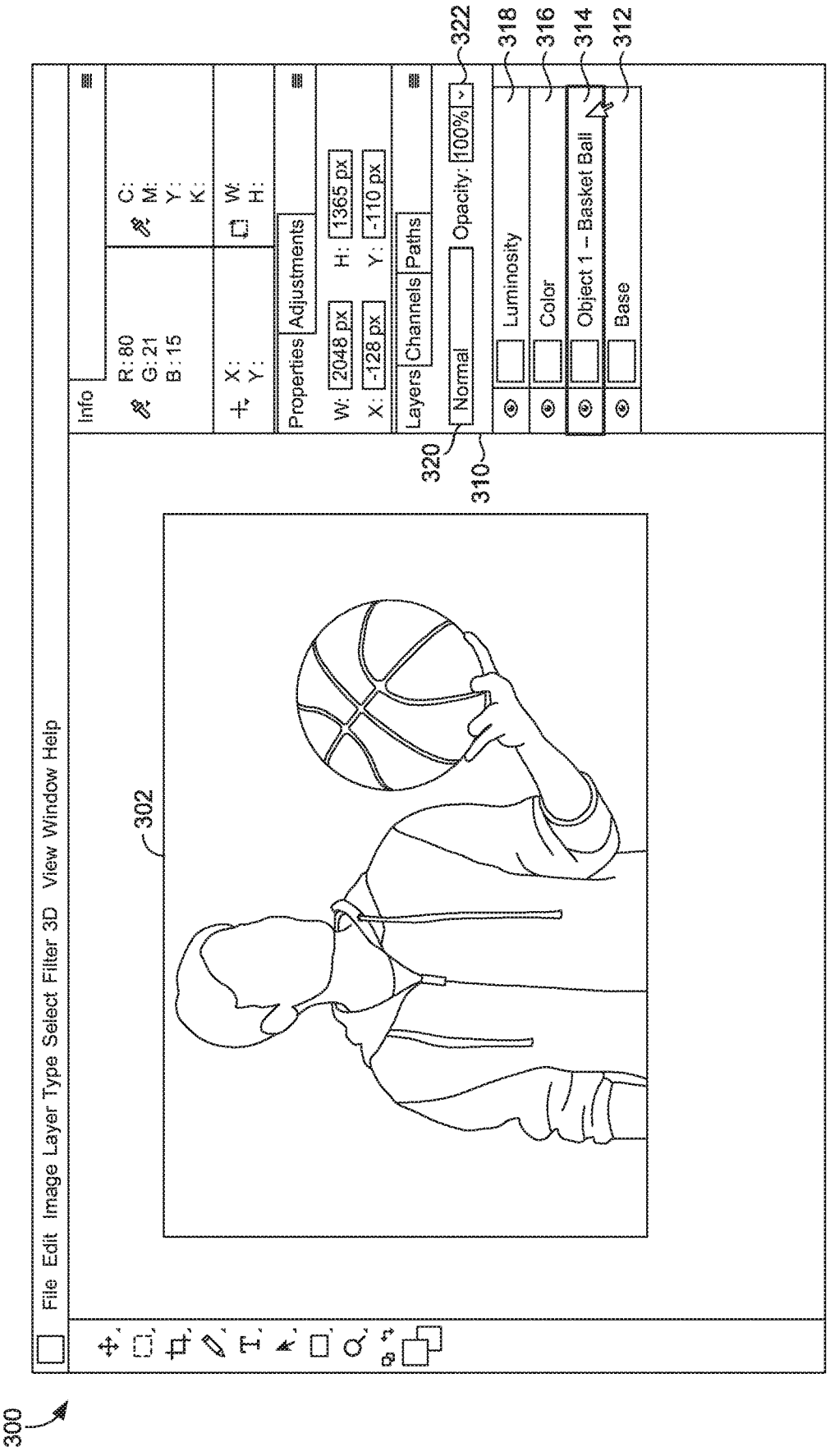
FIG. 3 depicts an example graphical user interface for compositing a graphical image document within an image processing application, in accordance with embodiments of the present disclosure.

Returning to the image processing application 210, the image processing application 210 may generally be responsible for performing one or more digital image processing functions. In exemplary aspects, the image processing application 210 comprises digital image editing programs useable for compositing layers within a graphical image document to render a digital image. As such, a user interface for the image processing application 210 may include a number of user controls to allow a user to define how a digital image is to be composited. An example user interface is shown in FIG. 3. Example image processing applications for implementing embodiments of this disclosure includes Adobe® Photoshop® and Adobe® Photoshop® Elements.

The image processing application 210 further includes a compositing engine 220 that is generally responsible for compositing layers within a graphical image document to render a digital image for displaying to a user. As mentioned, a graphical image document may be formed of a set of image layers, or layers of image data, which may include images, graphics, text, and the like, and rendering the graphical image document for display to a user requires compositing by combining layers of pixel data in a manner specified by the layers and, optionally, any applicable global compositing controls.

Figure 4:
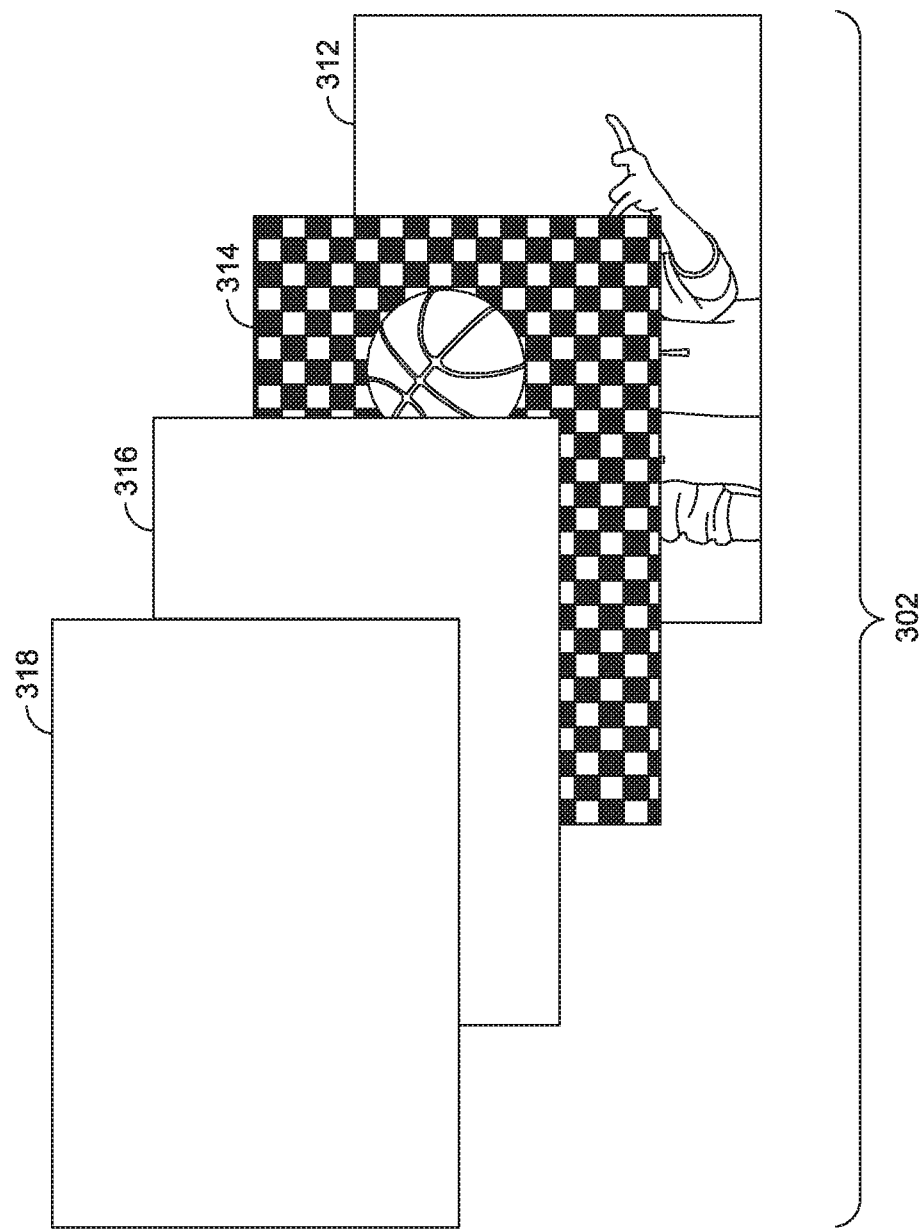
FIG. 4 depicts a schematic representation of the graphical image document in FIG. 3, in accordance with embodiments of the present disclosure.

FIG. 3 depicts an example graphical user interface 300 of one embodiment of the image processing application 210. The graphical user interface 300 includes a graphical image document 302. Although the graphical image document 302 appears as a single layer, layers area 310 of interface 300 shows that the graphical image document 302 is made up of a stack of layers (a first layer 312, a second layer 314, a third layer 316, and a fourth layer 318). FIG. 4 provides a schematic representation 400 of the graphical image document 302 as a stack (which may be referred to as an order) of layers 312, 314, 316, and 318.

Each layer may include an image, zero or more masks, a layer mode, which may be referred to as a color blending effect (e.g., a transfer mode, such as Normal, Dissolve, Multiply, Screen, etc.), and an opacity level, which may be referred to herein as a transparency treatment. Masks, if present, can also have color blending effects and transparency treatments. The masks, layer mode, and opacity level determine how the image within that layer is combined with the layers below and/or above that particular layer. As shown in FIG. 4, the first layer 312 includes an image of a person while the second layer 314 includes an image of a basketball only. When the second layer 314 is set to a normal layer mode and 100% opacity, the second layer 314 is combined with underlying the first layer 312 to appear as a single image of the person with the basketball as shown in FIG. 3. Additional layers, such as the third layer 316 and the fourth layer 318 may be combined with the combination of the first layer 312 and the second layer 314 to provide color and luminosity adjustments, for instance.

In some embodiments, a user interface may include user-selectable controls for defining properties of each layer, such as layer mode and opacity level. For instance, returning to FIG. 3, a layers area 310 of the example graphical user interface 300 includes a layer mode menu 320 and an opacity level selector 322. In some embodiments, a user may initially define the layer mode and/or opacity level for a layer. In other embodiments, layer mode and/or layer opacity level are automatically defined by an application, such as the image processing application 210, and the mode and/or opacity level may be adjusted by the user where desired. Accordingly, reference to a user-defined layer mode or user-defined layer opacity level herein includes when values for these properties are initially defined by the user, automatically defined by an image processing application and changed the user, or automatically defined by the image process application and left unchanged by the user when the user is given the ability to change the values. Further, in addition to defining layer properties, the graphical user interface 300 may provide for user-defined orders of the layers within the stack. An initial user-defined order may be determined based on a chronological order in which a user creates the layers, and the user may rearrange existing layers within the stack to set a new order.

Returning to FIG. 2, the compositing engine 220 may perform one or more functions to composite layers for displaying a digital image. While FIG. 2 depicts the compositing engine 220 as part of the image processing application 210 separate from other components, it is understood that compositing, in accordance with embodiments of the disclosure, may involve other components, including an application program interface 212, domain-specific language components 214, and components residing on the GPU 204, for instance. As such, the compositing engine 220 may represent only part of the functioning for compositing layers in accordance with some embodiments.

The compositing engine 220 generally traverses a graphical image document to determine relevant compositing information, call on one or more domain-specific language components to generate encoded commands for operations to carry out the compositing, and commit a command buffer with the encoded work to a GPU for processing. As such, example embodiment of the compositing engine 220 in the system 200 includes a layer properties identifier 222, a compositing operations determiner 224, a domain-specific language function caller 226, and a command buffer component 228.

The layer properties identifier 222 and the compositing operations determiner 224 are, collectively, generally responsible for identifying operations needed for compositing layers within a graphical image document. The layer properties identifier 222 identifies the layer properties specific to each layer within a particular graphical image document. Because the layer properties are at least partly defined by a user and not entirely predefined, the layer properties identifier 222 traverses the graphical image document to identify the layer properties instead of identifying the information from a stored database. In example embodiments, the layer properties identifier 222 determines a layer mode and an opacity level for each layer. The layer mode indicates the manner in which the layer is to be combined with another layer. For example, in exemplary embodiments, the layer mode defines the manner in which a first layer is to be combined with a second layer immediately below the first layer. An opacity level indicates a degree to which a first layer is transparent over at least the second layer immediately below. One or both of the layer mode and opacity level may be selected by the user as discussed with respect to the graphical user interface 300 in FIG. 3. In some embodiments, the layer properties identifier 222 also identifies a data type for each layer, which may depend on the image representation. For instance, a data type may be 8-bit integer, indicating each pixel is defined by an 8-bit integer within a range of 0 to 255. Another data type may comprise HDR image, which indicates each pixel may be within a greater range.

The compositing operations determiner 224 may determine one or more operations for compositing the graphical user document according to the layer properties identified by the layer properties identifier 222. For instance, compositing a graphical image document having three layers may include combining the first layer with the second layer and then combining the combination of the first two layers with a third layer. The first layer may have a "burn" layer mode with an 80% opacity level, and a first set of operations may be identified for combining the first layer with the second layer. The second layer may have a "normal" layer mode and a 30% opacity level, which will provide a second set of operations for combining the first two layers with the third layer. In some embodiments, the operations for combining layers are determined as a sequence of operations (which may be referred to herein as an operation-based sequence) such that combining the first layer with the second layer includes a first sequence of operations and combining the first two layers with the third layer includes a second sequence of operations. Additionally or alternatively, the operations for compositing all the layers of a graphical image document may include a layer-based sequence where the set (or sequence) of operations for combining the first two layers with each other may be performed before the set (or sequence) of operations for combining the first two layers with the third layer.

In exemplary embodiments, compositing operations are being determined as property information is identified for each layer. In other words, the compositing operations determiner 224 does not wait for layer property information to be identified for an entire graphical image document but, instead, determines operations as the graphical image document is traversed. As such, traversal of a graphical image document may include both identifying properties of each layer and determining operations based on the layer property information. Further, traversal of a graphic image document by the layer properties identifier 222 and the compositing operations determiner 224 may be based on an order of the layers, which refers to the sequence in which the layers are arranged within the stack. In some embodiments, traversal may follow a top-down order (e.g., starting with the fourth layer 318 in FIG. 4) or a bottom-up order (e.g., starting with the first layer 312 in FIG. 4).

After one or more operations (or, in some embodiments, a sequence of operations) is identified by the compositing operations determiner 224, the domain-specific language function caller 226 may call upon one or more domain-specific language components 214 for optimized code for the determined operations. As such, the system 200 may further include one or more application program interfaces (API) 212 that are generally responsible for facilitating communications between the image processing application 210 and one or more other components within system 200. In various embodiments, the API 212 is used by image processing application 210 to communicate with domain-specific language components 214. Specifically, one or more components of compositing engine 220, such as the domain-specific language function caller 226, and/or the command buffer component 228, may communicate with the domain-specific language components 214 via the API 212.

The domain-specific language components 214 are generally responsible for providing platform-optimized code for functions called to be performed by the GPU 204. Because code is generated and optimized for a particular platform, the domain-specific language function caller 226 may also communicate an indication of the particular platform of the GPU that will be performing the compositing operations (e.g., AMD APP, NVIDIA or Intel OpenCL) to a domain-specific language component 214. This communication may be part of the one or more calls to the domain-specific language components 214 to provide platform-optimized code for particular operations. In alternative aspects, the indication of a platform may be sent to the domain-specific language components 214 prior to the DSL-generated functions being called.

As previously discussed, an exemplary embodiment of the domain-specific language components 214 is Halide, which generally refers to the actual programming language, the compiler, runtime components, or a combination thereof. In exemplary embodiments, the domain-specific language components 214 include a domain-specific language compiler 216 and a domain-specific language runtime 218.

The domain-specific language compiler 216 is generally responsible for automatically providing code for image processing programs (including functions for compositing image layers) that is optimized for different domains or platforms. In exemplary embodiments, the domain-specific language compiler 216 automatically generates digital image processing code that takes advantage of memory locality, vectorized computation, and multi-core CPUs and GPUs. When using the domain-specific language compiler 216, algorithm definitions may be decoupled from the execution schedule (locality and parallelism dictating when and where an algorithm is computed), such as in the example of Halide. By decoupling the execution schedule and algorithm, the domain-specific language compiler 216 allows for portability in that code may be automatically generated for different platforms. In this way, the domain-specific language compiler 216 may generate code executable by different types of GPUs such that a single image processing application may be used with different GPU platforms (either simultaneously on a single user device or on different user devices) without manually coding for each possible type. Therefore, platform-optimized code, as used herein, refers to code automatically generated for a particular platform. The execution schedule includes a mapping of image process pipelines to a parallel machine. The schedule may be automatically generated or manually developed by a programmer. The domain-specific language compiler 216 generates platform-optimized code according to the schedule and the image processing algorithm.

The domain-specific language compiler 216 may run within an image processing application. Halide, for instance, is an embedded language with a compiler that is part of the programming language (in C++ or Python, for example) that runs within a program, such as the image processing application 210. In this way, the image processing pipeline is passed to the Halide compiler as programming language data structures, such as C++ data structures, rather than source code text.

In one embodiment, the domain-specific language compiler 216 operates as an ahead-of-time (AOT) compiler in which the platform-optimized code is output as an object file in a library that is linked to other code within the image processing application. In this way, the domain-specific language compiler 216 either may be used to facilitate accessing the object file from a run time library during runtime or may not be present on a user device after compiling occurs. In some embodiments, the domain-specific language compiler 216 operates as an AOT compiler but still determines scheduling operations (including those relating to vectoring, splitting, and parallelizing) during runtime based on the platform of the GPU 204, the image data being processed and/or the compositing operations being called. In alternative embodiments, the domain-specific language compiler 216 operates entirely as a just-in-time compiler that generates platform-optimized code during execution of programs within the image processing application 210. The output of a just-in-time compiler may go directly into memory within the image processing application 210 and may be immediately used to execute a function.

The domain-specific language components 214 further include domain-specific language runtime 218 that is generally responsible for passing data to the GPU 204 for image compositing as determined by the compositing engine 220. More specifically, the domain-specific language runtime 218 provides encoded objects within a runtime environment to instruct the GPU 204 to perform compositing operations. The instructions for the GPU 204 are provided in the form of commands within a command buffer that is passed to the GPU 204 via a command queue. A command includes instructions (in the form of platform-optimized code) to perform an operation identified by the domain-specific language function caller 226 of the compositing engine 220. As such, in response to a call from the domain-specific language function caller 226 identifying a compositing operation that needs to be performed and, in some embodiments, a platform of the GPU 204 that will perform those operations, the domain-specific language runtime 218 puts a corresponding command in a command buffer. A command buffer is a temporary storage area where commands are stored. One command buffer may include multiple commands for compositing based on calls from the domain-specific language function caller 226. A command buffer may also include raw image data from the graphical image document, the image data being the data on which the compositing operations corresponding to the commands in the command buffer are performed. Each command buffer is placed within a command queue that holds the command buffers until they are ready to be committed to the GPU 204 for execution.

As previously mentioned, traditional implementations of using a domain-specific language, like Halide, for compositing operations involve a domain-specific language component not only placing commands in command buffers but also controlling committing the command buffers to the GPU. Providing control for committing command buffers to a domain-specific component traditionally either involves committing a command buffer after each command (which increases the amount of computational overhead) or requiring that the commands be predetermined so that the domain-specific language runtime can be configured to know when to submit all the commands (which is not feasible for compositing with user-defined layer orders or properties). Additionally, domain-specific language components traditionally commit command buffers so that they are executed synchronously such that the domain-specific language component waits for work on one command buffer to be completed by the GPU before creating and committing another one, which slows the processing speed.

As such, in exemplary embodiments of the present disclosure, the compositing engine 220 of the image processing application 210 further includes a command buffer component 228 that is generally responsible for determining when to execute command buffers to the GPU 204 and executing the command buffers. In at least some instances, the command buffer component 228 may determine when to commit a command buffer to the GPU 204 based on the size of the command buffer, a number of commands (or operations) within the command buffer, a time elapsed since the last command buffer was committed or a combination of these factors. As such, determining whether to commit a command buffer may include determining whether the current size of a command buffer satisfies (e.g., meets or exceeds) a predetermined threshold size, whether the current number of operations within a command buffer satisfies a predetermined threshold number of operations, and/or whether the current time since the last command buffer was committed satisfies a predetermined threshold amount of time.

Additionally or alternatively, determining when to commit the command buffer to the GPU may be based on a determination that all the compositing operations for the graphical image document or a specified portion thereof have been encoded. In some embodiment, the determination of when to commit the command buffer may be based on either the described predetermined metric (such as size, number of commands, or time) or all the operations for compositing a graphical image document or an area thereof being already encoded and put on a command buffer. In other words, when there are no more compositing operations to encode for the document or a specified portion thereof, the command buffer component 228 may determine the command buffer should be committed to the GPU 204 even when the command buffer has not satisfied a threshold size, number of operations or time since the last command buffer. In other embodiments, the determination of when to commit a command buffer may be based solely on when all compositing operations for a predefined subsection of the graphical image document have been encoded. For example, a graphical image document may be formed of a plurality of subsections referred to as tiles, and a first command buffer may be committed to the GPU 204 when all the compositing commands for a first tile is encoded while a second command buffer for compositing operations for a second tile may then be created. The second command buffer may be committed to the GPU 204 upon determination that all of the compositing operations for the second tile have been encoded. In this way, asynchronous committal of command buffers to the GPU 204 occurs even when command buffer component 228 determines when to commit based on whether all compositing operations have been encoded.

Upon determining that the command buffer should be committed, the command buffer component 228 commits the command buffer to the GPU 204. After a command buffer is committed to the GPU 204, one or more shaders 232 in GPU 204 may be utilized to perform the compositing operations corresponding to commands within the command buffer. Processed image data may be stored in memory 230 (such as a GPU buffer) after being rendered by shaders 232.

In exemplary embodiments, command buffers are committed to the GPU 204 asynchronously such that command buffers may be committed to GPU 204 before work on the previous command buffer is completed, which may be determined by the GPU 204 sending a response to the CPU 202 or the CPU 202 polling the GPU 204 for the status of the command buffer. In this way, the command buffer component 228 may make a determination of whether to commit a command buffer to the GPU 204 without waiting for a response from the GPU 204. Rather, the command buffer component 228 may commit a command buffer to the GPU 204 while the GPU 204 is still processing the last command buffer.

After the rendered image data is generated on the GPU 204, the image data may be temporarily stored on memory 230 (e.g., GPU buffer). In some embodiments, the rendered image data is stored on memory 230 until it is sent back to memory on the CPU 202 for further operations within the image processing application 210 and then presented to a user. Additionally, or alternatively, the rendered image data may be kept on memory 230 on the GPU 204 until it is to be presented to the user.

System 200 further includes a presentation component 240 that is generally responsible for presenting composited images to a user in accordance with embodiments of the present disclosure. The presentation component 240 may comprise one or more applications or services on a user device and may determine how to present the processed image data to a user via a user interface, such as graphical user interface 300 of FIG. 3. The presentation component 240 may be utilized for presenting composited graphical image documents on a display screen such as described with respect to the presentation component 816 of FIG. 8.

Example system 200 also includes storage 242 that generally stores information including data, computer instructions (e.g., software program instructions, routines, or services), and logic used in embodiments described herein. In an embodiment, storage 242 comprises a data store (or computer data memory). Further, although depicted as a single data store component, storage 242 may be embodied as one or more data stores or may be in the cloud.

Figure 5A:
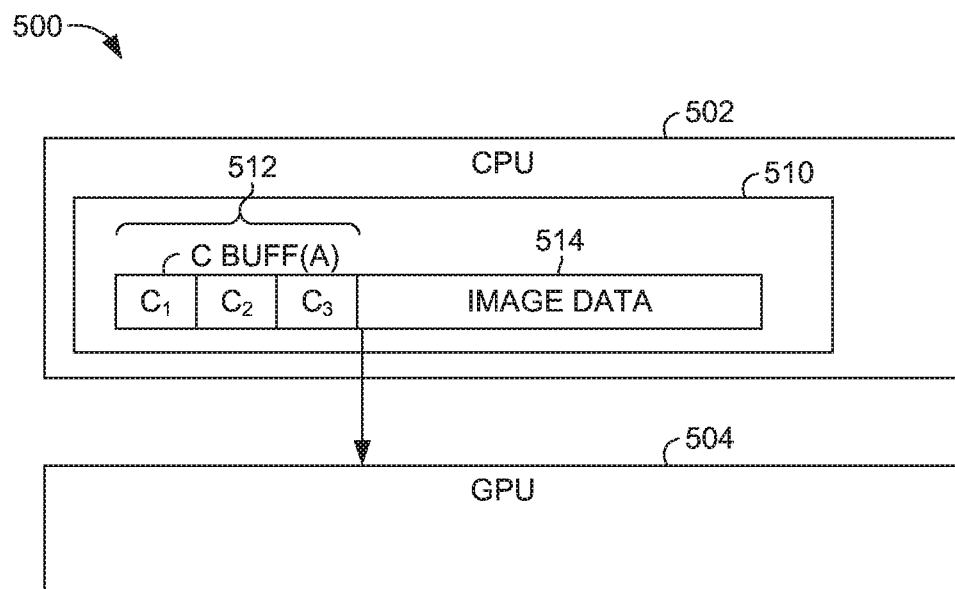
FIGS. 5A-5C depict schematic representations of asynchronous execution of compositing operations on the GPU, in accordance with embodiments of the present disclosure.
Figure 5B:
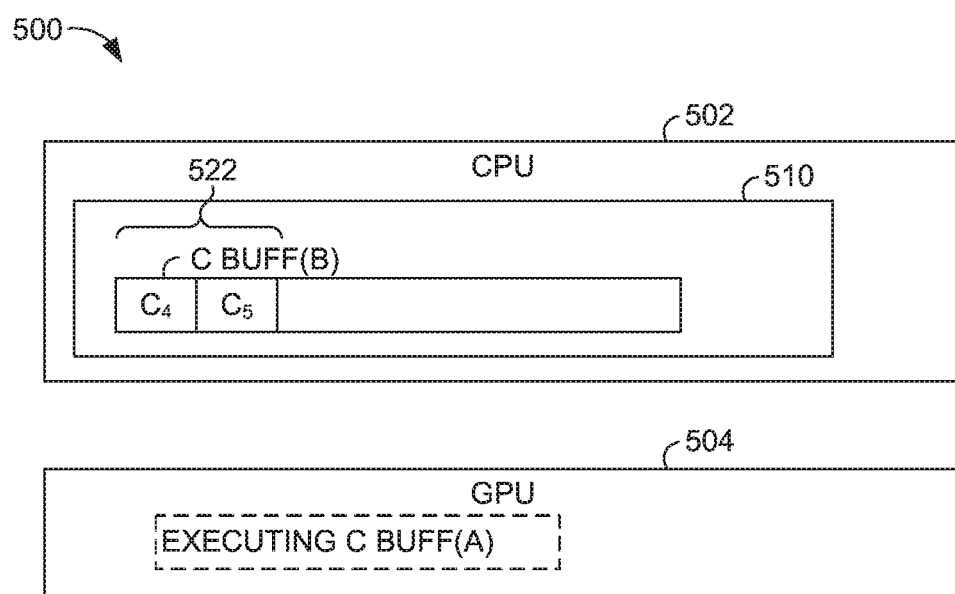
Figure 5C:
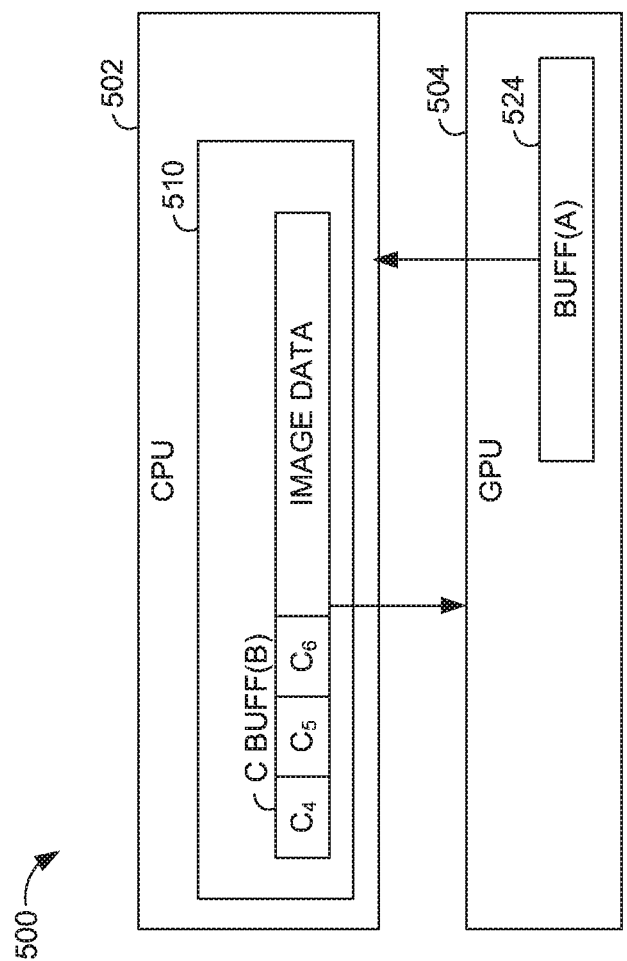

FIGS. 5A-5C provide a schematic representation 500 of commands being passed to between a CPU 502 and a GPU 504 according to embodiments of the disclosure. Within a CPU 502, such as an embodiment of the CPU 202 in FIG. 2, commands for compositing and corresponding image data are placed within command buffers. In FIG. 5A, commands 512 ($C_1$, $C_2$, and $C_3$) are placed within command buffer A in command queue 510. These commands 512 correspond to compositing operations identified by a compositing engine within an image processing application (e.g., an embodiment of the compositing engine 220 of image processing application 210 in FIG. 2). Additionally, the commands 512 are written in platform-optimized code corresponding to the GPU 504 and may be placed within the command buffer by a domain-specific language runtime, such as an embodiment of the domain-specific language runtime 218 in FIG. 2. Command buffer A also includes raw image data 514 from a graphical image document being composited. The raw image data 514 is the data that is to be processed by the GPU 504 in accordance with the commands 512 in command buffer A.

The command queue 510 holds a command buffer until the CPU 502 is ready to commit the command buffer to the GPU 504 for execution. Although FIG. 5A depicts a single command buffer, it will be appreciated that multiple command buffers may be placed within the command queue 510. According to embodiments of the present disclosure, an image processing application, such as the image processing application 210 of FIG. 2, is responsible for committing command buffers to the GPU 504. Specifically, an embodiment of the command buffer component 228 of the compositing engine 220 in FIG. 2 may determine when to commit command buffers within the command queue 510 to GPU 504 as previously described with respect to FIG. 2. In some embodiments, command buffer A is committed to the GPU 504 when the size of command buffer satisfies a predetermined threshold size. Alternatively, command buffer A is committed to the GPU 504 when it is determined that all compositing operations within a predefined subsection of the graphical image document have been encoded. In FIG. 5A, commands 512 and image data 514 satisfy a predetermined threshold size, and command buffer A is committed to the GPU 504.

In FIG. 5B, the GPU 504 is processing command buffer A by executing commands 512. At the same time that the GPU 504 is processing command buffer A, command buffer B is being created on CPU 502. Command buffer B may be created in a similar manner as command buffer A. Commands 522 ($C_4$ and $C_5$) may correspond to compositing operations identified by a compositing engine of an image processing application and written in platform-specific code for the GPU 504. Creation of command buffer B does not require that the GPU 504 finish executing the commands 512 on command buffer A. Similar to command buffer A, command buffer B may be committed to GPU 504 based on a determination that the command buffer B satisfies a predetermined threshold, such as a threshold size. This determination may be done by an embodiment of command buffer component 228 of compositing engine 220 in FIG. 2. Alternatively, command buffer B is committed to the GPU 504 when it is determined that all compositing operations within a predefined subsection of the graphical image document (that is different than a predefined subsection for command buffer A) have been encoded.

FIG. 5C depicts command buffer B (now including $C_4$, $C_5$, and $C_6$) being committed to the GPU 504 while the processed image data 524 from executing commands 512 in command buffer A is sent back to the CPU 502. Although FIG. C depicts the processed image data 524 being sent to the CPU 502 when the next command buffer is being sent to the GPU 504, it is understood that the processed image data may be sent before or after the next command buffer is sent to the GPU 504 and that the GPU 504 may include multiple command buffers waiting to be executed or being executed contemporaneously. Additionally, the processed image data may be stored on the GPU 504 (such as in a GPU buffer, for example) while the rest of the compositing operations are performed for an entire graphical image document, and all of the processed image data may be transferred to memory on the CPU 502 together.

Figure 6:
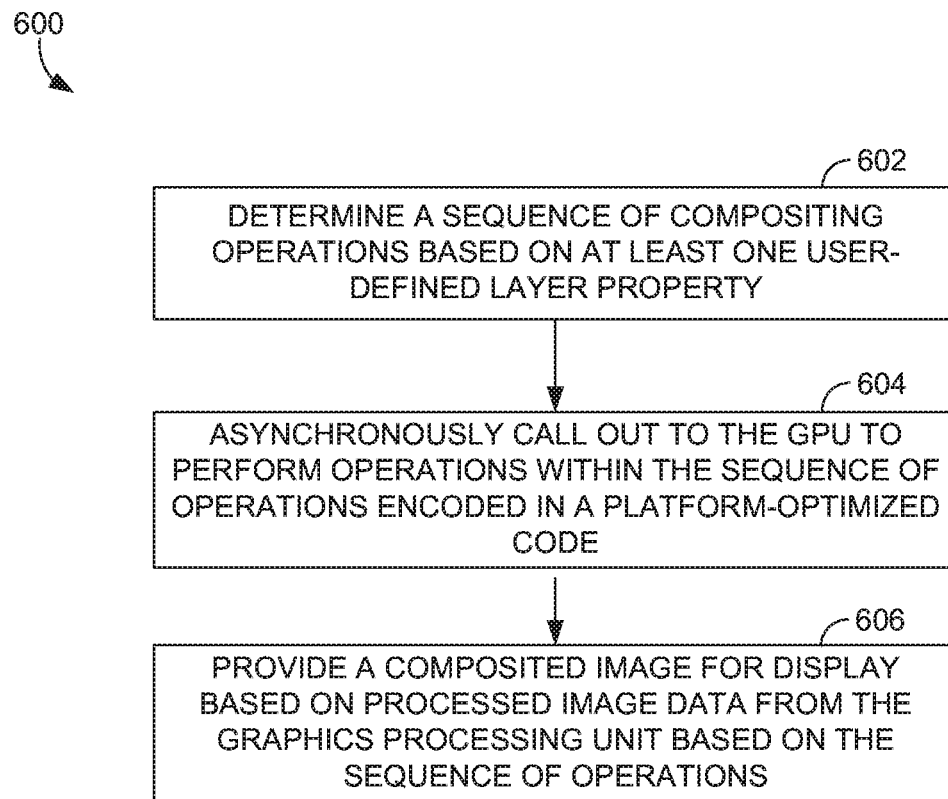
FIG. 6 depicts a flow diagram showing a method utilizing a GPU to perform user-defined compositing operations, in accordance with embodiments of the present invention.

With reference to FIG. 6, a flow diagram is provided to show an embodiment of a method 600 for performing user-defined compositing operations on a GPU with platform-optimized code. Each block of method 600 and other methods described herein, including method 700 of FIG. 7, comprises a computing process that may be performed using any combination of hardware, firmware, and/or software. For instance, various functions may be carried out by a processor executing instructions stored in memory. The methods may be provided by a standalone application, a service or hosted service (either standalone or in combination with another hosted service), or a plug-in to another product, for example.

Method 600 may be performed in whole or in part by an embodiment of the image processing application 210 of FIG. 2 and, more specifically, the compositing engine 220 of image processing application. At block 602, a sequence of operations for compositing layers of image data is determined. The operation sequence is based on at least one user-defined layer property. An operation that is based on at least one user-defined layer property is referred to herein as a user-defined operation. In exemplary embodiments, a user-defined layer property includes a layer mode, an opacity level, or a presence of a layer mask. One or more of these properties may be defined by a user for one or more of the layers as discussed with respect to FIGS. 3 and 4. The compositing operations may further be determined based on an image data type. Block 602 may be performed by an embodiment of the compositing operations determiner 224 in FIG. 2. In some embodiments, method 600 further includes identifying at least one user-defined layer property by an embodiment of the layer properties identifier 222 in FIG. 2, which may include receiving at least one indication of a user-defined layer property.

Because layers are composited according to the order in which the layers are arranged, the sequence of operations is also determined by a user-defined order of layers. As discussed with respect to FIG. 4, a user-defined order may correspond to or be based on the order in which the layers are created or may be an order of the layers after one or more are rearranged by the user.

At block 604, method 600 further includes asynchronously calling out to the GPU to perform operations within the sequence of operations. These operations are encoded with a platform-optimized code before being sent to the GPU. The domain-specific language used to generate the platform-optimized code is Halide in exemplary embodiments. Further, calling out to the GPU may include calling out to a domain-specific language runtime to provide the platform-optimized code based on the platform of the GPU. An indicator of the platform of the GPU may be sent to the domain-specific language runtime through an application user interface, such as an embodiment of API 212 in FIG. 2. Block 604 may be performed by an embodiment of the domain-specific language function caller 226 in FIG. 2. One embodiment of block 604 is further described in greater detail as method 700 with respect to FIG. 7.

At block 606, a composited image is provided for display on a user device, such as user device 102a of FIG. 1. The composited image is formed of processed image data received from the GPU after performing the sequence of compositing operations. The processed image data may be sent directly from the GPU to a presentation component for display to user, such as the presentation component 240, or may be sent to a presentation component via the image processing application 210.

Figure 7:
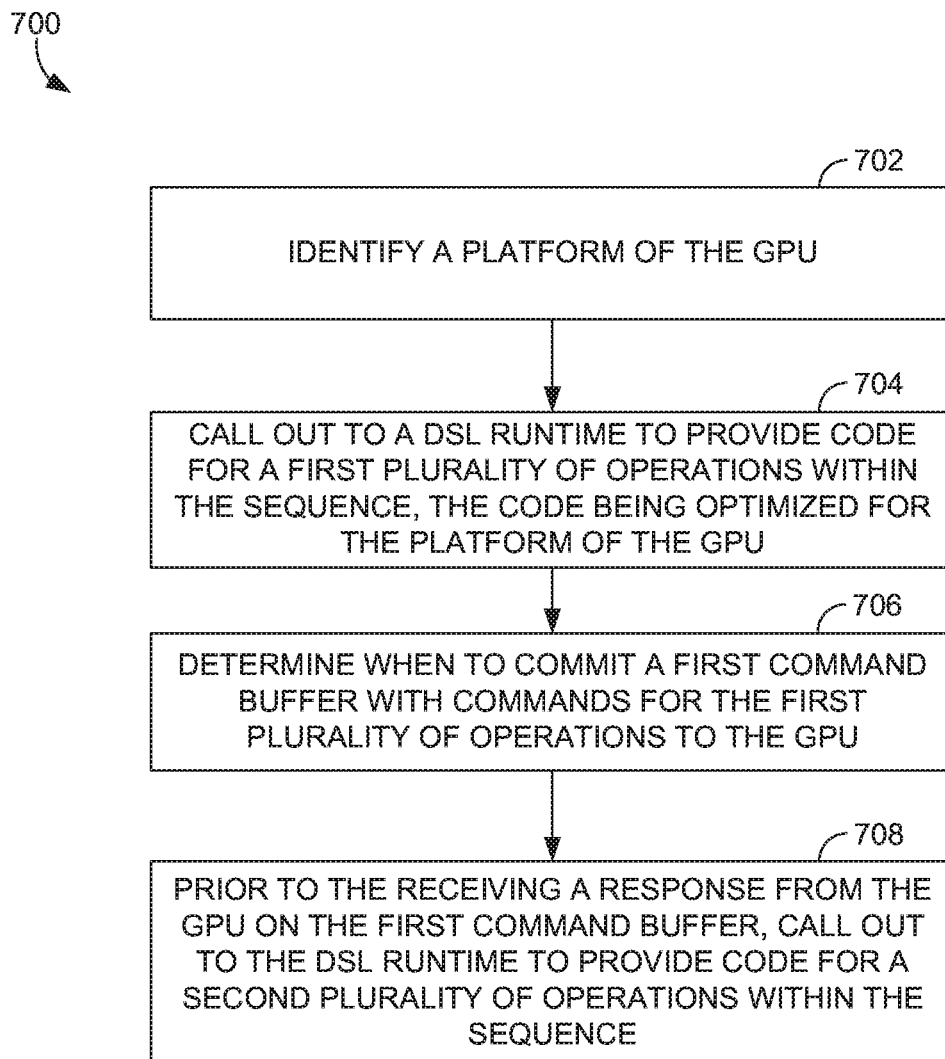
FIG. 7 depicts a flow diagram showing a method for asynchronously calling on the GPU for performing user-defined compositing operations, in accordance with embodiments of the present disclosure.

FIG. 7 depicts a block diagram illustrating an example method 700 for asynchronously calling on the GPU for performing compositing operations in accordance with an embodiment of the present invention. One or more blocks of method 700 may be performed, for example, by the compositing engine 220 in FIG. 2 alone or in cooperation with the domain-specific language runtime 218 and/or compiler 216.

At block 702, the platform of the GPU may be identified. Example platforms of a GPU include AMD APP, NVIDIA or Intel OpenCL. At block 704, method 700 including calling out to a domain-specific language runtime to provide code for a first plurality of operations for compositing image data. The code provided by the domain-specific language runtime is optimized for the platform of the GPU. In exemplary embodiments, the domain-specific language runtime is Halide.

Operations encoded in the platform-optimized code are referred to as commands, which are placed in a command buffer within a command queue until the commands are ready to be sent (committed) to the GPU. The command buffer also includes raw image data to be processed according to the commands. At block 706, it is determined when to commit a first command buffer with commands for the first plurality of operations to the GPU. Determining when to commit the first command buffer to the GPU may be performed by an embodiment of command buffer component 228 of FIG. 2. In exemplary embodiments, the first command buffer is committed to the GPU when the command buffer satisfies a threshold for size, number of commands, time elapsed since the previous buffer was committed, or a combination thereof. As such, block 706 may include comparing the size of the first command buffer to a predetermined threshold size, comparing the number of operations within the first command buffer to a predetermined amount of operations, and/or comparing the time elapsed since committing the immediately preceding command buffer to a predetermined time. Additionally or alternatively, block 706 may include determining whether all the compositing operations for a predetermined area of the graphical image document have been encoded.

Once committed, the operations corresponding to the commands in the command buffer are performed by the GPU. Processed image data may be temporarily stored in a buffer within the GPU before it is displayed to the user.

At block 708, method further comprises, prior to the work on the first command buffer being completed by the GPU (e.g., prior to the commands on the first command buffer being executed), calling out to a domain-specific language runtime to provide code for a second plurality of operations for compositing image data. In exemplary embodiments, work on a command buffer is considered not yet completed by the GPU until a response is provided from the GPU, either from the GPU sending a response to the CPU while the CPU is in an inactive state or from the CPU polling the GPU for the status of the command buffer. The code provided by the domain-specific language runtime is optimized for the platform of the GPU in a similar manner as block 704 for the first plurality of operations. Block 708 may occur without waiting for the GPU to finish executing the first plurality of operations and/or to send a response to the image processing application.

In exemplary embodiments, method 700 further includes creating a second command buffer with commands for the second plurality of operations and determining whether to commit the second command buffer to the GPU in a similar manner as described with respect to block 706. Prior to work on the second command buffer being completed, a call for a third plurality of operations may be made, and this process may continue until all compositing operations are performed. The composited image maybe provided for display to a user.

Additionally, it will be appreciated that reference to a first plurality of operations, a second plurality of operations, and the like are in reference to groups of operations that are committed to the GPU together via a shared command buffer. These groupings of operations may (but do not necessarily) correspond to sets or sequences of operations needed for compositing each layer. For example, compositing a first layer and a second layer may require a first sequence of operations that will be encoded in a first command buffer while compositing a third layer and a further layer may require a second sequence of operations that will be encoded in the second command buffer. In another instance, compositing a first layer and a second layer may require a first sequence of operations that may be split into two command buffers with a first plurality of operations in a first command buffer and a second plurality of operations in a second command buffer.

Figure 8:
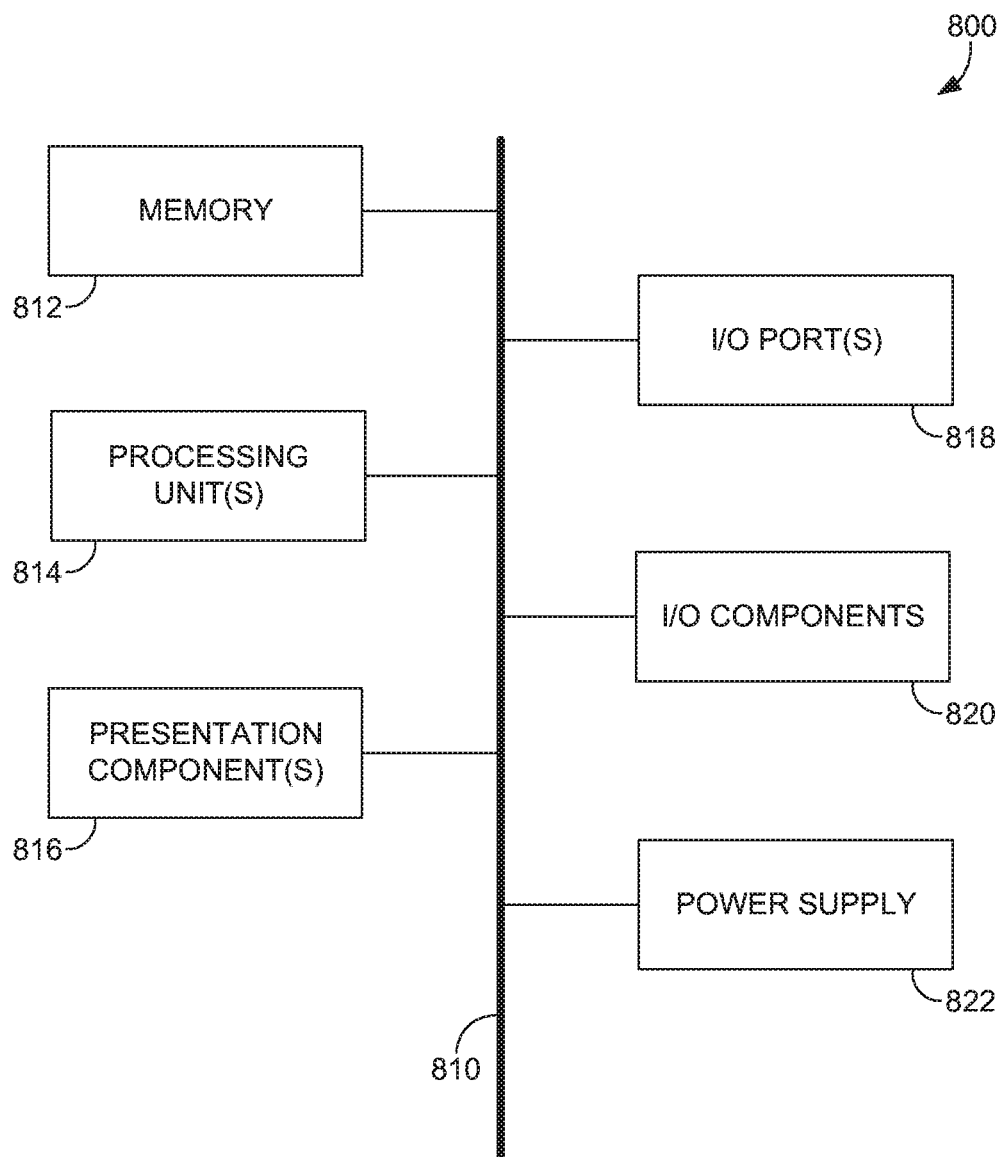
FIG. 8 is a block diagram of an example operating device in which embodiments of the present disclosure may be employed.

Having described an overview of embodiments of the present invention, an exemplary computing environment in which embodiments of the present invention may be implemented is described below in order to provide a general context for various aspects of the present invention. Referring now to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processing units 814 (such as central processing unit 202 and graphics processing unit 204 of FIG. 2), one or more presentation components 816, input/output (I/O) ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. As used herein, computer storage media does not comprise non-transitory media such as signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components 816 include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

What is claimed is:

1. One or more computer storage media having a plurality of executable instructions embodied thereon that, when executed by one or more processors, cause the one or more processors to perform a method comprising:
determining a sequence of operations for compositing a plurality of layers of image data, wherein the sequence of operations is based on at least one user-defined layer property and includes a first plurality of operations and a second plurality of operations;
calling out to a domain-specific language runtime to provide code for the first plurality of operations and the second plurality of operations within the sequence, the code being generated for a platform of a graphics processing unit;
determining, by an image processing application, when to commit a first command buffer with commands for the first plurality of operations to the graphics processing unit and when to commit a second command buffer with commands for the second plurality of operations to the graphics processing unit, wherein the first command buffer and the second command buffer are determined to be committed to the graphics processing unit at different times, and wherein the domain-specific language runtime is called to provide code for the second plurality of operations prior to the graphics processing unit returning image data from the first command buffer; and
providing a composited image for display based on processed image data from the graphics processing unit for at least the first command buffer and the second command buffer.

2. The computer storage media of claim 1, wherein the at least one user-defined layer property comprises a layer mode or an opacity level.

3. The computer storage media of claim 1, wherein the sequence of operations is further based on a data type corresponding to the image data.

4. The computer storage media of claim 1, wherein the domain-specific language runtime is Halide.

5. The computer storage media of claim 1, wherein determining when to commit the first command buffer to the graphics processing unit comprises determining whether the first command buffer satisfies a threshold size.

6. The computer storage media of claim 1, the method further comprising sending an indication of the platform of the graphics processing unit to the domain-specific language runtime.

7. A computing system comprising:
one or more processors; and
one or more computer storage media having instructions stored thereon that, when executed by the one or more processors, cause the computing system to provide:
a means for providing platform-optimized code for a sequence of operations to composite layers of image data within a graphical image document, the means for providing platform-optimized code comprising:
determining the sequence of operations based on at least one user-defined layer property, the sequence of operations comprising a first plurality of operations and a second plurality of operations, and
calling out to a domain-specific language runtime to provide code for the sequence of operations, the code being optimized for a platform of the graphics processing unit; and
a means for asynchronously committing command buffers with commands for performing the sequence of operations encoded in the platform-optimized code to a graphics processing unit, wherein the means for asynchronously committing command buffers comprises:
determining whether to commit a first command buffer with encoded commands for the first plurality of operations to the graphics processing unit;
before commands on the first command buffer are executed by the graphics processing unit, creating a second command buffer with encoded commands for the second plurality of operations,
wherein control over the first command buffer and the second command buffer is shared between an image processing application and the domain-specific language runtime through an application programming interface.

8. The computing system of claim 7, wherein determining when to commit the first command buffer to the graphics processing unit includes determining there are no more operations needed to be encoded for compositing a first subsection of the graphical image document, and wherein determining when to commit the second command buffer to the graphics processing unit includes determining there are no more operations needed to be encoded to composite a second subsection of the graphical image document.

9. The computing system of claim 7, wherein the image processing application utilizes the application programming interface to instruct the domain-specific language runtime of the platform of the graphics processing unit.

10. A computer-implemented method for utilizing a graphics processing unit for compositing image data, the method comprising:
determining a sequence of operations for compositing a plurality of layers of image data, wherein the sequence of operations is based on at least one user-defined layer property and includes a first plurality of operations and a second plurality of operations;
asynchronously calling out to the graphics processing unit to perform the first plurality of operations and the second plurality of operations, wherein the first plurality of operations and the second plurality of operations are provided to the graphics processing unit as objects encoded in a platform-optimized code provided by a domain-specific language runtime;
determining, by an image processing application, when to commit a first command buffer with commands for the first plurality of operations to the graphics processing unit and when to commit a second command buffer with commands for a second plurality of operations to the graphics processing unit, wherein the first command buffer and the second command buffer are determined to be committed to the graphics processing unit at different times, and wherein the domain-specific language runtime is called to provide code for the second plurality of operations prior to the graphics processing unit returning image data from the first command buffer; and
providing a composited image for display based on processed image data from the graphics processing unit.

11. The computer-implemented method of claim 10, wherein the second plurality of operations are determined after the domain-specific language runtime is called to provide code for the first plurality of operations.

12. The computer-implemented method of claim 10, wherein the domain-specific language runtime is Halide.

13. The computer-implemented method of claim 10 further comprising providing an indication of the platform of the graphics processing unit to the domain-specific language runtime.

14. The computer-implemented method of claim 10, wherein the at least one user-defined layer property comprises a layer mode, an opacity level, or a mask.

* * * * *